(12) United States Patent
Shanmugam

(10) Patent No.: US 10,638,885 B2
(45) Date of Patent: May 5, 2020

(54) FOOD-PROCESSING TOOLS AND FOOD-PROCESSING APPLIANCES INCORPORATING SAME

(71) Applicant: Sivaprakash Shanmugam, Havant (GB)

(72) Inventor: Sivaprakash Shanmugam, Havant (GB)

(73) Assignee: KENWOOD LIMITED (GB)

( * ) Notice: Subject to any disclaimer, the term of this patent is extended or adjusted under 35 U.S.C. 154(b) by 747 days.

(21) Appl. No.: 15/033,316

(22) PCT Filed: Oct. 29, 2014

(86) PCT No.: PCT/GB2014/053221
§ 371 (c)(1),
(2) Date: Apr. 29, 2016

(87) PCT Pub. No.: WO2015/063484
PCT Pub. Date: May 7, 2015

(65) Prior Publication Data
US 2016/0278578 A1    Sep. 29, 2016

(30) Foreign Application Priority Data
Oct. 31, 2013 (GB) .................................. 1319230.7

(51) Int. Cl.
*A47J 43/07* (2006.01)
*B02C 15/00* (2006.01)

(52) U.S. Cl.
CPC ......... *A47J 43/0722* (2013.01); *B02C 15/004* (2013.01)

(58) Field of Classification Search
CPC ...... B02C 15/004; A47J 42/02; A47J 43/0722
USPC ........ 366/287–288, 292, 305; 241/92, 282.1, 241/282.2
See application file for complete search history.

(56) References Cited

U.S. PATENT DOCUMENTS

| 2,676,760 A | 4/1954 | Simpson |
| 2,808,239 A * | 10/1957 | Reiffen .................... A21C 1/02 366/313 |
| 2012/0257471 A1 | 10/2012 | Unteregger et al. |

(Continued)

FOREIGN PATENT DOCUMENTS

| DE | 3541389 A1 | 5/1987 |
| EP | 2599411 A1 | 6/2013 |
| FR | 2743709 A1 | 7/1997 |

(Continued)

OTHER PUBLICATIONS

International Search Report and Written Opinion of the International Searching Authority for PCT/GB2014/053221, dated Dec. 9, 2014; ISA/EP.

(Continued)

*Primary Examiner* — Elaine Gort
*Assistant Examiner* — Christopher B Wehrly
(74) *Attorney, Agent, or Firm* — Harness, Dickey & Pierce, P.L.C.

(57) ABSTRACT

A tool for a food processor has a first member driven in rotation and a second stationary member which have complementary working surfaces for rolling engagement formed of a stone-like material for working ingredients into a thin paste-like form, the surfaces being conical or cylindrical.

16 Claims, 6 Drawing Sheets

(56) References Cited

U.S. PATENT DOCUMENTS

2016/0048720 A1    2/2016  Palmer et al.

FOREIGN PATENT DOCUMENTS

| GB | 357655 A | 10/1931 |
| GB | 637015 A | 5/1950 |
| GB | 1228167 A | 4/1971 |
| WO | WO-2008004229 A2 | 1/2008 |

OTHER PUBLICATIONS

Search Report of the Great Britain Priority Application No. 1319230.7, dated Apr. 29, 2014.
Examination Report from Government of India for Application No. 201627010609, dated Sep. 19, 2019, with English translation (6 pages).

* cited by examiner

FOOD-PROCESSING TOOLS AND FOOD-PROCESSING APPLIANCES INCORPORATING SAME

CROSS-REFERENCE TO RELATED APPLICATIONS

This application is a 371 U. S. National Stage of International Application No. PCT/GB2014/053221, filed on Oct. 29, 2014 and claims priority to Great Britain Application No. 1319230.7, filed on Oct. 31, 2013. The entire disclosures of the above applications are incorporated herein by reference.

This invention relates to food-processing tools, and to food-processing appliances, such as food processors and stand mixers, incorporating such tools.

Food-processing appliances are extremely versatile and, indeed, the range of tasks which such appliances are expected to perform in the kitchen is ever-expanding, particularly with increased awareness of exotic foods and healthy eating.

One object of this invention is to provide tools which, when attached to food-processing appliances, can further enhance their versatility. Another object is to provide food-processing appliances incorporating such tools.

A particular objective of the invention is to provide, for attachment to food-processing appliances, tools which facilitate a food-processing operation known as wet grinding; a procedure that is used widely, especially in Indian cuisine, to make traditional foods such as Dosa or Idli (rice cakes) and lentil cakes typically eaten at breakfast. Key to making these dishes is the ability to create a smooth, semi-liquid mixture (batter) or a thin paste of rice, lentils, chick peas etc. This requires the use of a mechanical crushing process (as opposed to the cutting or chopping action more usually associated with food processors); the crushing action advantageously mashing and compressing the ingredients, rather than simply chopping or slicing them, and thereby retaining to a greater extent their original flavours.

Moreover, the more conventional cutting or chopping actions of food processors can tend to heat, and thereby impair the flavour of, certain ingredients. Cutting and chopping actions, as opposed to crushing actions, also tend to produce suspensions, rather than the aforementioned semi-liquid mixture (batter) or thin pastes which are generally required for the above-mentioned cuisine.

According to the invention there is provided a tool for attachment to a food-processing appliance provided with an electric motor and means for utilising the motor to provide a rotary drive means for said tool; the tool comprising a first food-processing tool member adapted to be driven in rotation by said rotary drive means and a second food-processing tool member adapted to remain stationary within said vessel during a food-processing operation; said first and second food-processing tool members having complementary working surfaces adapted for rolling inter-engagement during relative rotational movement between said food-processing tool members, and wherein at least said complementary working surfaces of said first and second food-processing tool members are each formed of stone-like material capable of working ingredients into a semi-liquid mixture (batter) or thin paste-like form.

Preferably the complementary working surfaces are curved, being either conical or cylindrical in form.

In some preferred embodiments of the invention, at least one or both of said complementary working surfaces are conical in form.

In some such embodiments, the second food-processing tool member may comprise an annular member disposed to surround said rotary drive means and presenting a frusto-conical working surface which tapers from its inner diameter towards its outer diameter which is disposed closely adjacent an upright wall of said vessel. In such circumstances, it is preferred that the first food-processing tool member comprises a plurality of conical members supported to depend from a yoke member driven in rotation by means of said rotary drive means and each adapted to roll on said frusto-conical working surface of said second food-processing tool member during rotation of said yoke member.

In a particularly preferred form of this embodiment of the invention, the said first food-processing member comprises a pair of conical members disposed in diametrically opposed relationship to the rotational axis of said rotary drive means.

In other preferred embodiments of the invention, at least one or both of said complementary working surfaces are cylindrical in form and, in some such embodiments, said second food-processing tool member comprises a hollow, substantially cylindrical member disposed along the rotational axis of said rotary drive means and it is further preferred that said first food-processing member comprises a plurality of cylindrical members supported to depend from a yoke member driven in rotation by means of said rotary drive means and each adapted to roll around the cylindrical working surface of said second food-processing tool member during rotation of said yoke member.

In some such embodiments, the second food-processing tool member is provided with suspension means suspending it from a lid of the vessel so as to pass through an aperture formed in the yoke member and provided with a bearing surface. In other such embodiments, the second food-processing member comprises an annular member disposed to surround said rotary drive means and adapted to be held in place during a processing operation by fitment about a stationary part of said vessel surrounding said rotary drive means. It is further preferred that the yoke member is driven by an extension from said drive member passing through the second food-processing member.

In other preferred embodiments of the invention, of the kind in which said complementary working surfaces are cylindrical in form, said first food-processing tool member comprises a substantially cylindrical member disposed along the rotational axis of and driven by said rotary drive means and said second food-processing member comprises a plurality of cylindrical members supported to depend from a yoke member held stationary during a processing operation by means of a base fitment engaging with a stationary part of said vessel surrounding said rotary drive means and with the lower ends of said cylindrical members of said second food-processing tool member; the arrangement being such that each of said cylindrical members of said second food-processing tool member is caused to roll around its own axis by frictional contact with the cylindrical working surface of said first food-processing tool member during rotation of said first food-processing tool.

In particularly preferred forms of embodiments of the invention utilising cylindrical geometry for the food-processing tool members, the said first food-processing member comprises a pair of cylindrical members disposed in diametrically opposed relationship to the rotational axis of said rotary drive means.

The invention extends to a tool substantially as described with reference to and/or as shown in the accompanying drawings. The invention also extends to a food-processing appliance substantially as described with reference to and/or as shown in the accompanying drawings.

The invention extends to methods and/or apparatus substantially as herein described with reference to the accompanying drawings.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In order that the invention may be clearly understood and readily carried into effect, certain embodiments thereof will now be described, by way of example only, with reference to the accompanying drawings, of which:

The wet grinding process is traditionally implemented by working the ingredients between a fixed stone and a moving stone. Typically, granite or granite-like stone is used, although it will readily be appreciated that any material suitable for the purpose can be used, and the invention is expressly not limited to the use of granite or even to the use of a natural stone. Suitable synthetic materials can be used instead if preferred.

In any event, during a grinding operation, the abrasive action breaks down the structure of the ingredients to produce a consistent paste. The grinding action is further enhanced by the addition of a small amount of water, hence wet grinding, which helps break the material down and helps cool the resulting paste. Wet grinding is carried out under a lower frequency than cutting or slicing applications and aims to break down the ingredients in a more natural way while mixing it with the water to produce the right consistency.

Figure 1:
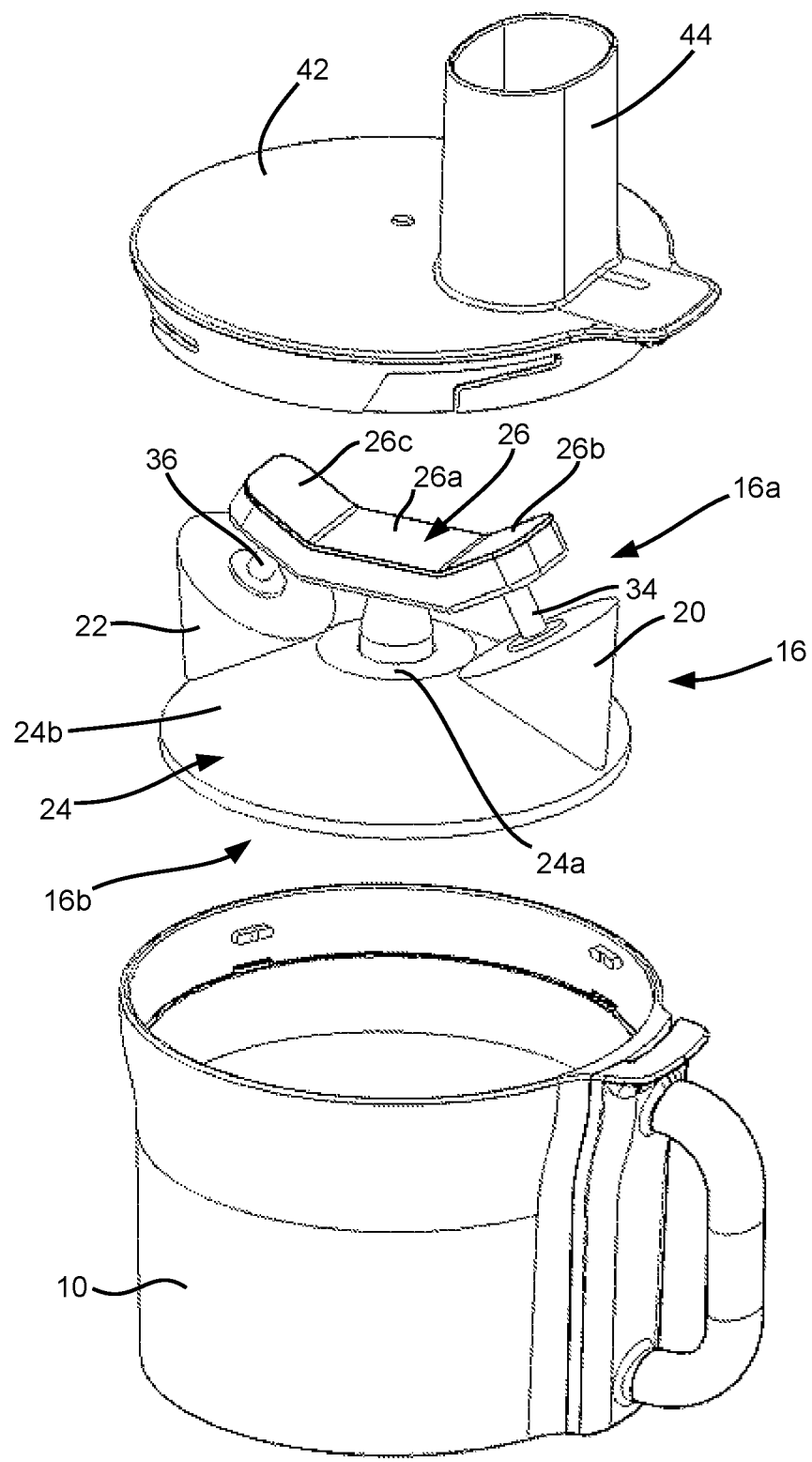
FIG. 1 shows an exploded view of a food-processing vessel and a food-processing tool in accordance with a first embodiment of the present invention.
Figure 2:
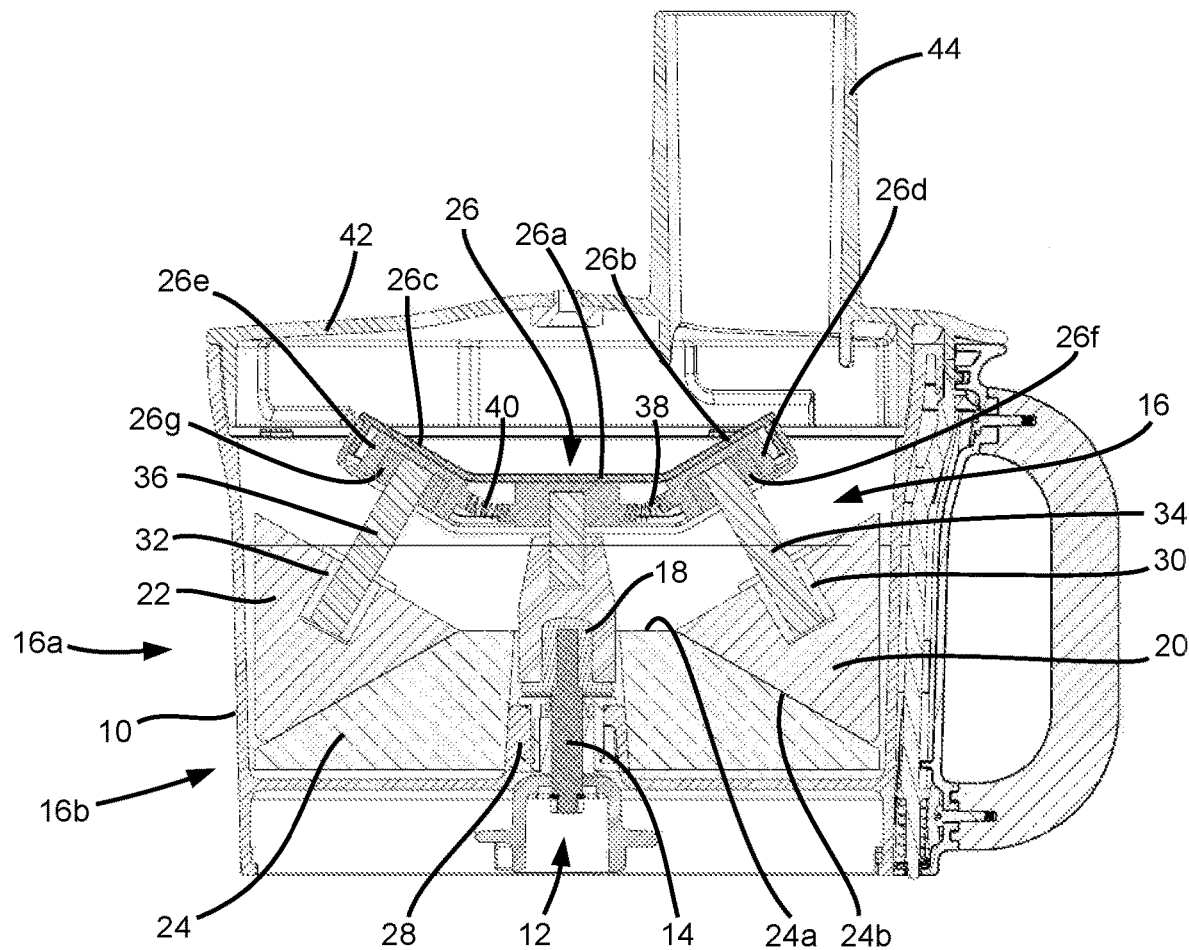
FIG. 2 shows a cross-section through the bowl and tool of FIG. 1 as assembled for use.

Referring now to FIGS. 1 and 2 of the drawings, similar features in all of which are indicated by the same reference numbers, these show a food-processing tool in accordance with a first embodiment of the invention as incorporated into the bowl of a food processor and set up to be driven from beneath the bowl by means of a drive system of known kind conveying rotational drive through the base of the bowl.

Although the food-processing appliance to which the tool of this embodiment is attached is a food processor, the invention, as has been said above, is equally applicable to tools for attachment for stand mixers.

According to the first embodiment of the invention, the food processor comprises a powered base unit (not shown) which supports a vessel in the form of a food-processing bowl 10, the base of which incorporates a sealed drive transfer arrangement 12, of known kind, for picking up rotary drive from a power-driven outlet on the base unit and transferring it to a drive shaft 14 disposed for rotation about the central (vertical) axis of the bowl 10. A specially configured tool 16 which will be described in more detail hereinafter, has a first element 16*a* supported on, and driven in rotation by, the shaft 14 and a second, stationary element 16*b*. Typically, the upper part of the shaft 14 is splined and the rotary element 16*a* of the tool 16 is formed with a hollow, internally splined, socket 18 which can be pushed onto the splined shaft 14. Neither the powered base unit nor its driven outlet is shown, since both components can be entirely conventional and can, in any event, take any of many different forms without departing from the scope of the invention. Moreover, the construction of the sealed "through-the-base" drive transfer arrangement 12 is also well known to those skilled in the art, and thus will not be further explained herein.

In the illustrated embodiment of the invention, the rotary element 16*a* of the tool 16 includes a pair of identical, diametrically opposed food-processing tool members 20 and 22, which are conically shaped and designed to co-operate with the stationary element 16*b* of the tool 16. In this embodiment, the element 16*b* comprises a frusto-conically shaped base member 24 whose cone angle matches that of the tool members 20 and 22.

The tool members 20 and 22 are supported by a central yoke arrangement 26 which forms part of the mobile element 16*a* of the tool 16 and includes a central section 26*a* bearing a downwardly-dependent central shaft that incorporates the splined socket 18. By this means the yoke 26 and the members 20 and 22 can be driven in rotation, within the bowl 10, about the axis of the shaft 14. The tool members 20 and 22 are mounted to the yoke 26 so as to be capable of freely rotating about their respective axes.

Accordingly, when the shaft 14 is driven to cause the yoke 26 and the tool members 20 and 22 carried thereby to rotate within the bowl 10, the conical tool members 20 and 22 are caused to roll about their respective axes and in contact with the sloping surface of the stationary base member 24, thereby creating the desired grinding motion as explained above.

In this example, the mobile tool members 20 and 22 and the stationary base member 24 of the tool 16 are formed from granite or from a granite-like material (either naturally-occurring or synthetic) and will thus be referred to as "stones". In alternative arrangements, the members such as 20, 22 and 24, or one at least of them, may comprise surface layers or coatings of stone or of stone-like material supported on other materials, such as plastics or metallic materials.

To explain the construction of this embodiment of the invention in greater detail, the centre section 24a of the top face of the fixed base stone 24 is disposed flat and parallel to the base of the bowl 10, and the stone 24 then tapers downwards from the centre section 24a towards its outer diameter, thus approaching the base of the bowl 10 near its junction with the upright outer wall of the bowl 10 and thereby forming a frusto-conical component, presenting an inclined working surface 24b against which the tool members 20 and 22 can run to compress and grind ingredients.

The fixed base stone 24 thus covers a substantial area of the base of the bowl 10, though the stone 24 is annular and is fixed in position by virtue of its engagement with a stationary tapered tubular feature 28 upstanding from the base of the bowl 10 and surrounding the sealed drive transfer arrangement 12. The mass of the fixed base stone 24 and its interference fit around the periphery of the feature 28 prevent it from turning in normal operation or under the action of the conical rotating stones, comprising the tool members 20 and 22, revolving around it.

The two conical stones 20 and 22 comprising, with the yoke 26, the rotating element 16a of the tool 16, form a complementary grinding angle with the fixed base stone 24 and the upright side of the bowl 10. Each of the conical stones 20, 22 has a hollow core into which is fitted a respective cylindrical bushing 30, 32 supporting an associated shaft 34, 36. In each case, the bushings 30, 32 and the shafts 34, 36 are permanently affixed to their respective conical stones 20, 22.

The yoke assembly 26 has two arms 26b and 26c which are diametrically opposed and extend out from the flat centre section 26a, which is disposed substantially parallel to the base of the bowl 10, and the arms 26b and 26c are canted upwardly as shown from the flat centre section 26a. Each arm supports a respective bearing housing 26d, 26e, each with a respective bearing 26f, 26g fixed therein and positioned to receive a respective one of the shafts 34, 36, allowing the conical stones 20 and 22 to rotate about their respective axes. The mass of the two conical stones 20 and 22 ensures that contact is retained between them and the angled working face 24b of the base stone 24 during operation. It will be appreciated that a retention means of any convenient kind is provided to ensure that the shafts 34 and 36 are retained in their respective bearings 26f and 26g.

As the yoke assembly 26 and the stones 20 and 22 supported thereon rotate, the conical stones 20 and 22 roll around the angled working face 24b of the fixed base stone 24. Friction between the opposing surfaces encourages the conical stones 20 and 22 to rotate about the axis of their respective shafts 34 and 36, while being supported by the bearings 26f and 26g, thus ensuring smooth rotation of the conical stones 20 and 22.

The yoke assembly 26 is provided with resilient means, such as springs 38 and 40, that bear against a central part of the yoke assembly, on the one hand, and the bearing housings 26d and 26e respectively on the other hand. This arrangement accommodates a small amount of movement of the two bearing housings 26d and 26e within the yoke assembly 26 and allows for the angle of contact between the fixed base stone 24 and the rotating conical stones 20, 22 to change slightly, thereby allowing for variation in the ingredients being crushed and ensuring that the working faces of the conical rotating stones 20, 22 tend to return to the optimum position once these variations have been sufficiently worked under their action. It will be appreciated that the resilient means could comprise, for example, solid rubber pads or the like instead of the springs 38 and 40.

The bowl 10 is sealed during operation by a standard-fitting lid 42 with a feed-tube 44 which allows ingredients to be added during processing if desired. Usually, a pusher device (not shown) is provided by means of which a user can push ingredients through the feed-tube if necessary. It is usual to provide safety interlocks whereby the food processor will not operate unless the lid 42 is properly secured on to the bowl 10. An interlock may also be associated with the pusher device, if provided, and set up to disable the food processor unless the pusher is detected within the feed-tube 44.

It will be appreciated that, instead of the mobile element 16a of the tool 16 comprising two conical tool members, such as 20 and 22, mounted diametrically opposed with respect to the rotational axis of the drive member 14, three or four conical tool members disposed at 120 degree or 90 degree spacings respectively around the axis could be used, together with a correspondingly configured (three-limbed or four-limbed) yoke member in replacement for yoke 26.

Figure 3:
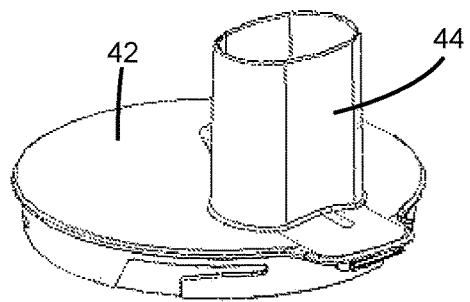
FIG. 3 shows an exploded view of a food-processing vessel and a food-processing tool in accordance with a second embodiment of the present invention.
Figure 3:
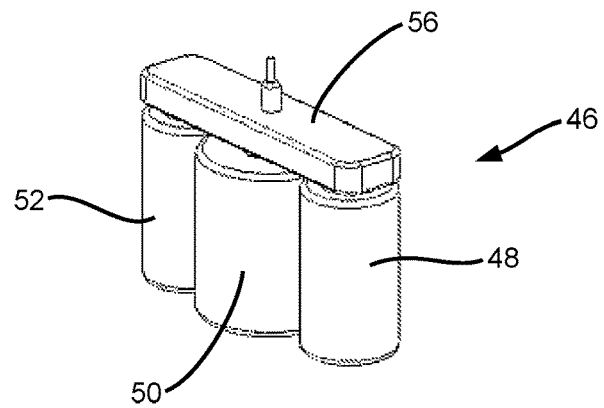
Figure 3:
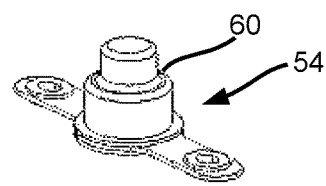
Figure 3:
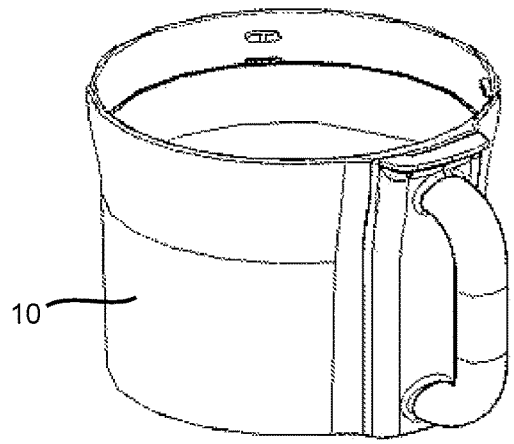
Figure 4:
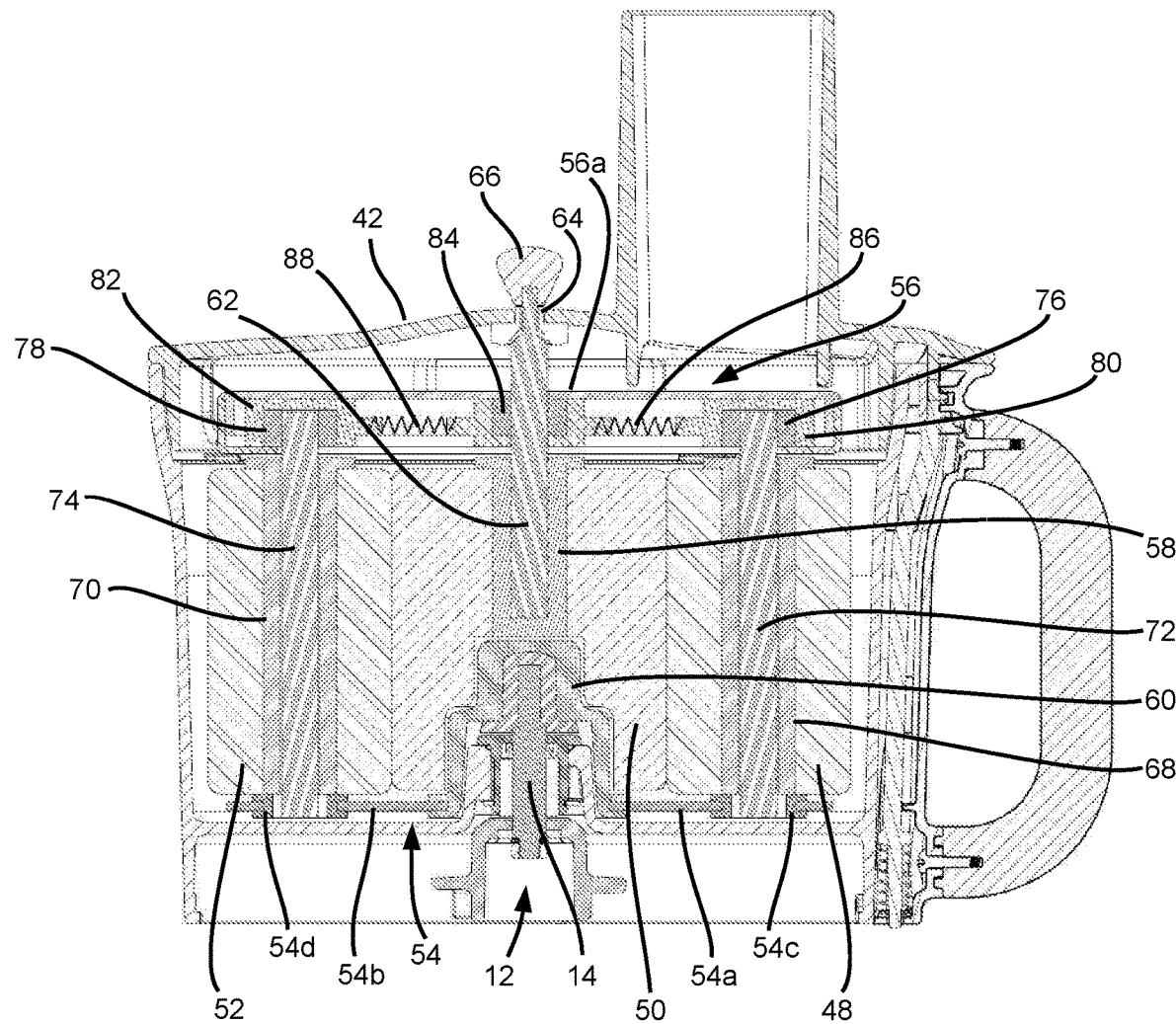
FIG. 4 shows a cross-section through the bowl and tool of FIG. 3 as assembled for use.

A second embodiment of the invention will now be described with reference to FIGS. 3 and 4. In this embodiment, the tool 16 of the previous embodiment is replaced by an alternative tool 46, comprising three cylindrical stones 48, 50 and 52 mounted side-by-side within the bowl 10, with their axes vertical. In this embodiment, the central stone 50 is mounted, as will be explained, so as to remain fixed within the bowl whilst the two outer stones 48 and 52 are caused to revolve around it.

In addition to the stones 48, 50 and 52, the tool 46 also comprises a bottom bracket assembly 54 and an upper yoke assembly 56. The central stone 50 has a hollow core which accommodates, at its upper end, a centre bushing 58 and, at its lower end, a drive cap 60 of the bottom bracket assembly 54. The centre bushing 58 is axially aligned with, and fixed permanently into, the hollow core of centre stone 50, and receives a centre shaft 62 which is fixed in position and extends upwards, axially of both the central stone 50 and the bowl 10, and through a central hole 64 in the lid 42 of the assembly. A nut 66 on the outside of the lid 42 fixes the centre shaft 62 in position with the centre stone 50 thus fixedly suspended below the lid 42 and axially aligned with the in-bowl drive mechanism 12, 14 below it.

The tool 46, as has been mentioned, further includes the two cylindrical stones 48 and 52, mounted to either side of the central stone 50, and the yoke assembly 56. Each of the stones 48 and 52 has a hollow core which supports a respective long cylindrical bushing 68, 70 and, inside the bushing, a respective shaft 72, 74. The bushings 68 and 70 are made of suitable material to enable smooth assembly between the cylindrical side stones 48 and 52 and their respective shafts 72 and 74. The bushings 68 and 70 and the shafts 72 and 74 are permanently fixed into their respective cylindrical stones 48 and 52.

The yoke assembly 56 extends out in diametrically opposite directions from its centre 56a and each end of the yoke 56 houses a respective bearing 76, 78 fixed in position within a respective bearing holder 80, 82. The outer stones 48 and 52 are mounted on to respective arms of the yoke 56 in such a way that the central axes of their respective shafts 72 and 74 are aligned with the axes of the respective bearings 76, 78, allowing the outer stones 48 and 52 to rotate about their respective axes. The yoke 56 is held in position above the centre stone 50 and has a central bearing 84 allowing the (stationary) centre shaft 62 of the central stone 50 to pass through it to reach the fixing 66 by means of which the shaft 62 is secured to the lid 42. The bearing 84 allows the yoke 56 and its attachments to rotate freely around the centre shaft 62.

The bottom bracket assembly 54 comprises the drive cap 60 which directly connects to, and encloses, the in-bowl drive mechanism 12, 14 without making contact with the centre stone 50 above it. The bottom bracket assembly 54 is fixed in position centrally to the drive cap 60 and parallel to the base of the bowl. Two integral arms 54a and 54b extend out from the centre of the bottom bracket 54; the arms 54a and 54b being diametrically opposite each other; and they rotate, along with the drive cap 60, driven by the in-bowl drive mechanism 12, 14. The bottom bracket 54 has an ovoid hole at each end, each of which is fitted with a respective bracket bush 54c, 54d. The bracket bushes 54c and 54d locate over the bottom ends of respective side stone shafts 72 and 74; thereby acting as dogs on the shaft ends. Rotation of the in-bowl drive mechanism 12, 14 via the user-controlled motor causes the drive cap 60 and bottom bracket 54 to rotate about the axis of the drive shaft 14. The bracket bushes 54c and 54d in the end of the bottom bracket 54, located over the free ends of the side stone shafts 72 and 74, pull the side stones 48 and 52 and cause them to rotate around the axis of the drive shaft 14, which is also the central axis of the bowl 10. At the same time, friction between the side stones 48 and 52 and the cylindrical centre stone 50 causes each of the side stones 48, 52 to rotate independently about its own longitudinal axis.

The yoke assembly 56 is provided with resilient means, such as springs 86 and 88, that bear against a central part of the yoke assembly, on the one hand, and the bushings 80, 82 respectively on the other hand. This arrangement accommodates a small amount of movement of the two bushings 80, 82 within the yoke assembly 56 and allows for slight changes in the angle of contact between the fixed central stone 50 and the rotating stones 48, 52, thereby allowing for variation in the ingredients being crushed and ensuring that the working faces of the rotating stones 48, 52 tend to return to the optimum position once these variations have been sufficiently worked under their action. It will be appreciated that the resilient means could comprise, for example, solid rubber pads or the like instead of the springs 86 and 88.

Figure 5:
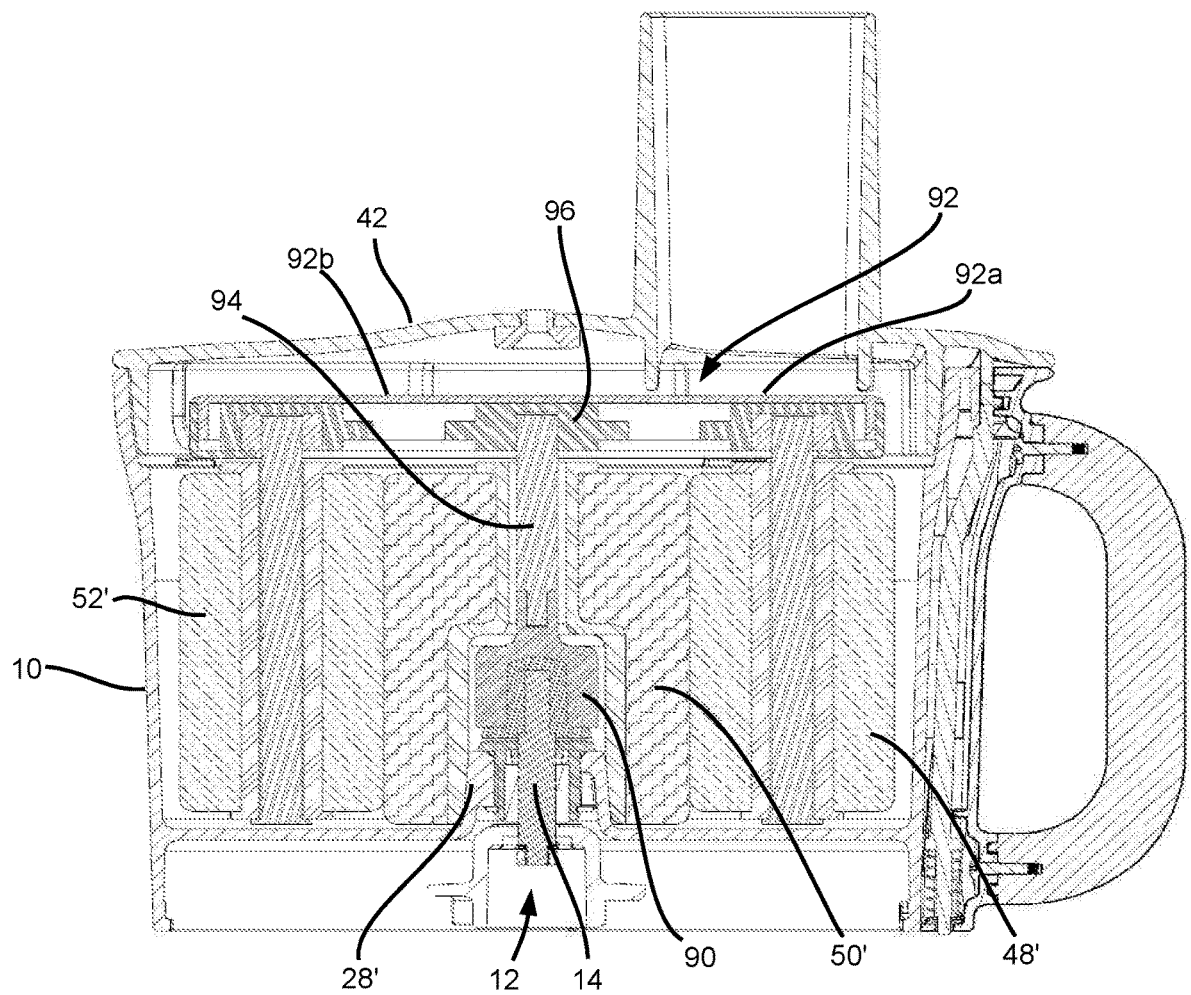
FIG. 5 shows a cross-section through the bowl and a tool in accordance with a third embodiment of the invention, as assembled for use.

In a third embodiment of the invention, shown in FIG. 5, the general layout of the stones used in the previous embodiment is retained, but the centre stone 50', instead of being fixed to the lid 42, is secured by engagement with the stationary tapered tubular feature 28' upstanding from the base of the bowl 10 and surrounding the sealed drive transfer arrangement 12. The mass of the fixed base stone 50' and its interference fit around the periphery of the feature 28' prevent it from turning in normal operation or under the action of the rotating stones, comprising the cylindrical stones 48' and 52', revolving around it.

Accordingly, the third embodiment of the invention retains the same general stone roller orientation as was described above in relation to the second embodiment.

A cylindrical adaptor 90, axially mounted on to the drive shaft 14 of the in-bowl drive mechanism 12, transmits the rotary motion to a yoke assembly 92 via a short link drive 94 which is permanently fixed to a centre bush 96 located in the centre of the yoke assembly 92. The yoke assembly 92 has a pair of arms 92a and 92b extending outward in diametrically opposed directions from its centre, from which are suspended the two cylindrical side stones 48' and 52' respectively; the assembly in this respect being similar to that of the second embodiment described above.

Rotation of the in-bowl drive mechanism 12 via the user-controlled motor causes the yoke assembly 92, and thus the side-stones 48' and 52', to rotate about the axis of the drive shaft 14 (also the central axis of the bowl 10) and, as before, the friction between the cylindrical side stones 48' and 52' and the cylindrical central stone 50' causes the side stones to rotate independently about their own axes; working the food between their facing surfaces.

Also as before, the moving stones 48' and 52' are spring-loaded to the yoke assembly 92 to allow for variation in the food being crushed and to ensure that the working faces of the outer cylindrical stones 48' and 52' always return to the optimum position against the central stone cylinder 50' once these variations have been sufficiently worked under their action.

Figure 6:
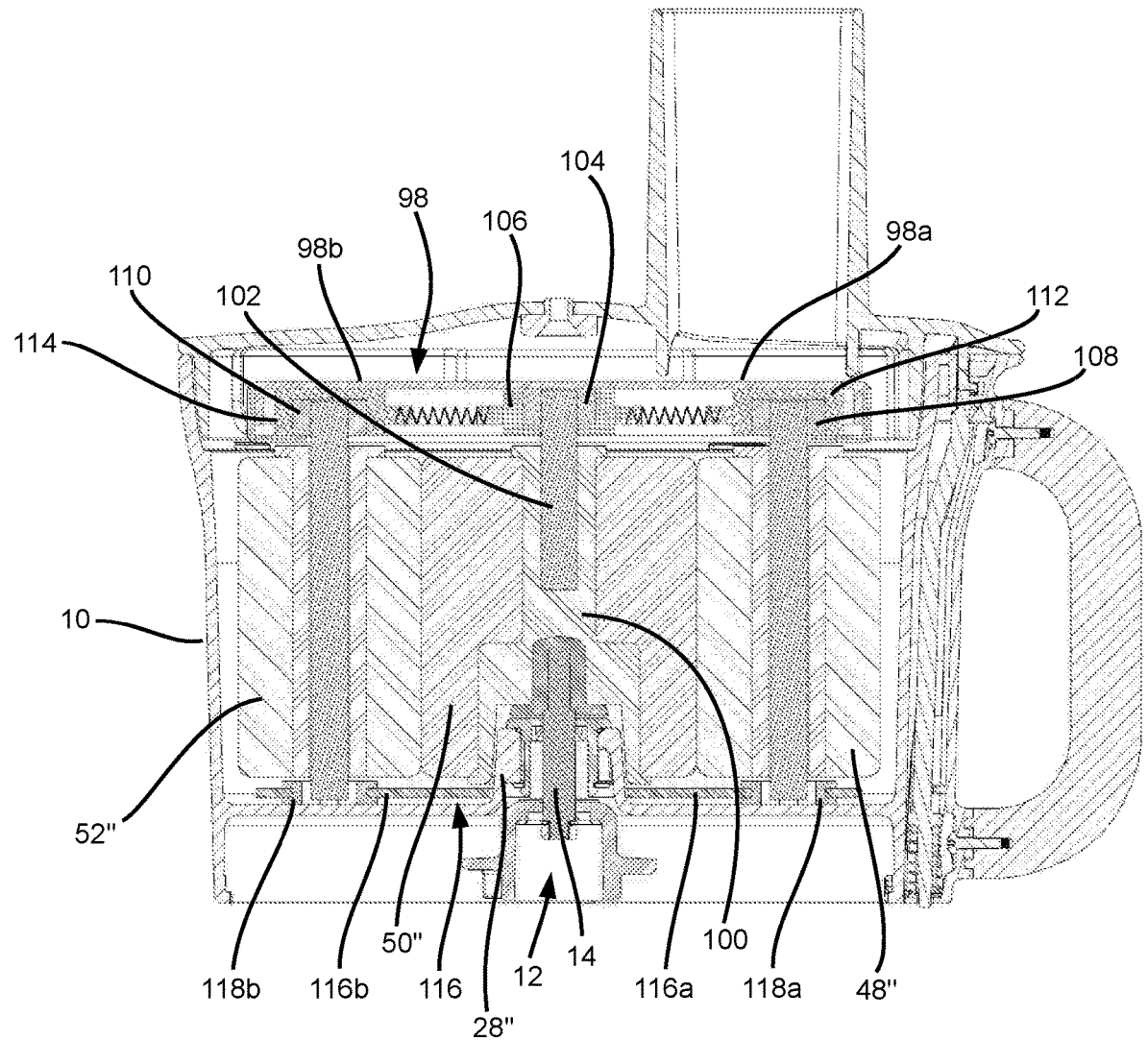
FIG. 6 shows a cross-section through the bowl and a tool in accordance with a fourth embodiment of the invention, as assembled for use.

In a fourth embodiment of the invention, shown in FIG. 6, the arrangement in terms of its general layout resembles that of the second and third embodiments. In this case, however, the roles of the central and outer stones are reversed, in that the central stone is caused to rotate about the axis of the drive shaft 14 by direct drive from the in-bowl drive mechanism 12, and the two outer stones are prevented from rotating about the drive shaft axis, though they can of course still rotate about their own individual axes, so as to permit their rolling contact with the cylindrical surface of the central stone 50".

The cylindrical side stone assembly which, in this embodiment, does not rotate about the axis of drive shaft 14, comprises the two cylindrical side stones 48" and 52" and a flat yoke assembly 98. The cylindrical central stone 50" has a hollow core to accommodate a central bush 100, which is axially aligned and fixed permanently in place. The central bush 100 is configured to pick up the drive directly from the in-bowl drive shaft 14 thus causing the central stone 50" to rotate about its own axis.

A short link shaft 102 is axially aligned with, and fixed permanently on to the undriven end of, the central bush 100. The short link shaft 102 is firmly seated in a bearing 104 located on the yoke assembly 98. The bearing 104 is fixed in position in a bearing holder 106 of the yoke assembly 98, thus enabling the central stone 50" to rotate about its own axis, relative to the yoke assembly 98, which has two arms 98a and 98b that extend out in diametrically opposed directions from its centre. Each of the arms 98a and 98b carries at its outer end a respective bearing 108, 110 and bearing support 112, 114 facing down towards the base of the bowl 10 and forming a virtual support bracket for the two cylindrical side stones 48" and 52", which are assembled to the yoke assembly 98 in a manner similar to that described above in relation to the third embodiment.

The two side stones 48" and 52" are further supported at the base of the bowl 10 by a bottom bracket 116 which is secured by engagement with the stationary tapered tubular feature 28" upstanding from the base of the bowl 10 and surrounding the sealed drive transfer arrangement 12, and is thus not driven by any means. The bracket 116 has two arms 116a and 116b that extend out diametrically from the centre parallel to the arms 98a and 98b of the yoke assembly 98 and each arm 116a, 116b has a respective bush 118a, 118b located in a through-hole at each end to support the mass of the cylindrical stones 48" and 52". The two cylindrical side stones 48" and 52" form a rolling interface with the central stone cylinder 50" at which working of the ingredients occurs.

Operation of the device via the user controlled motor settings causes the central stone cylinder 50" to rotate. The bearing 104 located in the yoke assembly 98 allows for the rotational movement of the central cylinder 50" while fixing the two side stones 48" and 52" in position within the bowl 10. Under the action of a frictional load, however, the two outer cylinders are free to rotate around their respective axes creating a constant change of interface between the three cylinders as the centre stone cylinder 50" rotates.

As before, the outer stones 48" and 52" are spring-loaded to the yoke assembly 98 to allow for variation in the food being crushed and to ensure that the working faces of the outer cylindrical stones 48" and 52" always return to the optimum position against the central stone cylinder 50" once these variations have been sufficiently worked under their action.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. An appliance provided with an electric motor comprising: a tool, a rotary drive for the tool, the took including a first food-processing tool member adapted to be driven in rotation by said rotary drive and a second food-processing tool member adapted to remain stationary within a vessel during a food-processing operation; said first and second food-processing tool members having complementary working surfaces, means for resiliently moving at least one of the first food-processing tool member and second food-processing tool member into a working position adapted for rolling inter-engagement by frictional contact between the working surfaces during relative rotational movement between said food-processing tool members, so as to cause said first food-processing tool member to roll around on the working surface of the second food-processing tool member; and wherein at least said complementary working surfaces of said first and second food-processing tool members are each formed of material capable of working ingredients into a paste.

2. The appliance according to claim 1, wherein said complementary working surfaces are conical in form.

3. The appliance according to claim 2, wherein the second food-processing tool member comprises an annular member disposed to surround said rotary drive and presenting a frusto-conical working surface which tapers from its inner diameter towards its outer diameter which is disposed closely adjacent an upright wall of said vessel.

4. The appliance according to claim 3, wherein the first food-processing tool member comprises a plurality of conical members supported to depend from a yoke member driven in rotation by means of said rotary drive and each adapted to roll on said frusto-conical working surface of said second food-processing tool member during rotation of said yoke member.

5. The appliance according to claim 2, wherein the said first food-processing member comprises a pair of conical members disposed in diametrically opposed relationship to the rotational axis of said rotary drive.

6. The appliance according to claim 1, wherein said complimentary working surfaces are conical or cylindrical in form.

7. The appliance according to claim 6, wherein said complementary working surfaces are cylindrical in form.

8. The appliance according to claim 7, wherein said second food-processing tool member comprises a hollow, substantially cylindrical member disposed along the rotational axis of said rotary drive.

9. The appliance according to claim 8, wherein said first food-processing tool member comprises a plurality of cylindrical members supported to depend from a yoke member driven in rotation by means of said rotary drive and each of the cylindrical members adapted to roll around a cylindrical working surface of said second food-processing tool member during rotation of said yoke member.

10. The appliance according to claim 9, wherein the second food-processing tool member is suspended from a lid of the vessel so as to pass through an aperture formed in the yoke member.

11. The appliance according to claim 9, wherein the second food-processing tool member comprises an annular member disposed to surround said rotary drive and adapted to be held in place during a processing operation on a stationary part of said vessel surrounding said rotary drive.

12. The appliance according to claim 11, wherein the yoke member is driven by an extension from said rotary drive passing through the second food-processing member.

13. The appliance according to claim 7, wherein said first food-processing tool member comprises a substantially cylindrical member disposed along the rotational axis of and driven by said rotary drive and said second food-processing tool member comprises a plurality of cylindrical members supported to depend from a yoke member.

14. The appliance according to claim 7, wherein one of said food-processing members comprises a pair of cylindrical members disposed in diametrically opposed relationship to the rotational axis of said rotary drive.

15. The appliance according to claim 1, selected from a food processor or a food mixer.

16. The appliance according to claim 1, wherein at least said complementary working surfaces of said first and second food-processing tool members are each formed of a stone.

* * * * *